United States Patent [19]

McDonald

[11] Patent Number: 5,144,835

[45] Date of Patent: * Sep. 8, 1992

[54] LIQUID LEVEL SENSING DEVICE AND METHODS OF MAKING AND OPERATING THE SAME

[75] Inventor: Charles W. McDonald, Gallatin, Tenn.

[73] Assignee: Robertshaw Controls Company, Richmond, Va.

[*] Notice: The portion of the term of this patent subsequent to Sep. 24, 2008 has been disclaimed.

[21] Appl. No.: 729,495

[22] Filed: Jul. 12, 1991

Related U.S. Application Data

[62] Division of Ser. No. 581,014, Sep. 12, 1990, Pat. No. 5,050,431.

[51] Int. Cl.[5] ............................................. G01F 23/26
[52] U.S. Cl. ..................................... 73/304 C; 63/207; 340/620; 361/284
[58] Field of Search .......................... 23/290 R, 304 C; 68/207; 340/620; 361/284; 324/660, 661, 664

[56] References Cited

U.S. PATENT DOCUMENTS

| | | | |
|---|---|---|---|
| 3,073,160 | 1/1963 | Shawhan | 73/304 C |
| 3,376,746 | 4/1968 | Roberto | 73/304 C |
| 3,533,286 | 10/1970 | Westcott et al. | 73/304 C |
| 3,596,517 | 8/1971 | Ryder | 73/304 C |
| 3,620,080 | 11/1971 | Ryder | 73/304 C |
| 4,674,324 | 6/1987 | Mulder | 73/304 C |
| 4,952,914 | 8/1990 | Mueller | 73/304 C X |
| 5,050,431 | 9/1991 | McDonald | 73/304 C |

FOREIGN PATENT DOCUMENTS

| | | |
|---|---|---|
| 5110914 | 8/1980 | Japan . |
| 566117 | 1/1981 | Japan . |

*Primary Examiner*—William A. Cuchlinski, Jr.
*Assistant Examiner*—G. Bradley Bennett
*Attorney, Agent, or Firm*—Candor, Candor & Tassone

[57] ABSTRACT

A liquid level sensing device for determining the level of a liquid in a liquid confining unit, methods of making and operating the device and a laundry machine using the device are provided, the device comprising a pair of electrode plates disposed in spaced apart relation so as to be adapted to be in a certain position relative to the confining unit and having opposed ends, an electrical circuit connected to the electrode plates for creating a voltage signal therefrom that varies in relation to the level of the liquid in the confining unit relative to the electrode plates, a control for determining the actual level of the liquid from the signal, and a third electrode plate disposed in spaced apart relation to the pair of electrode plates and being adapted to cooperate with one of the pair of electrode plates to provide a reference voltage signal to determine the electrolytic base of the liquid.

18 Claims, 2 Drawing Sheets

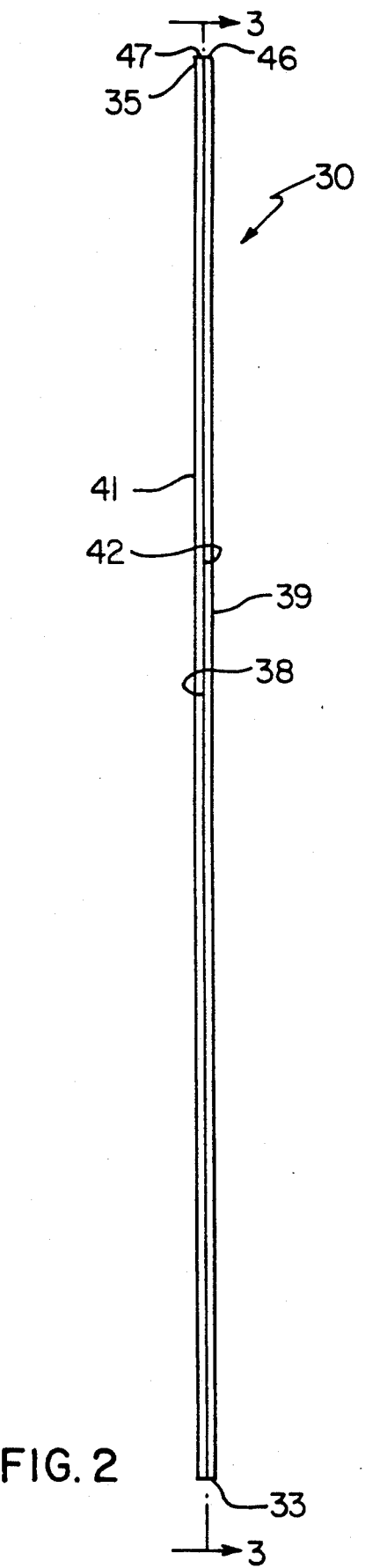
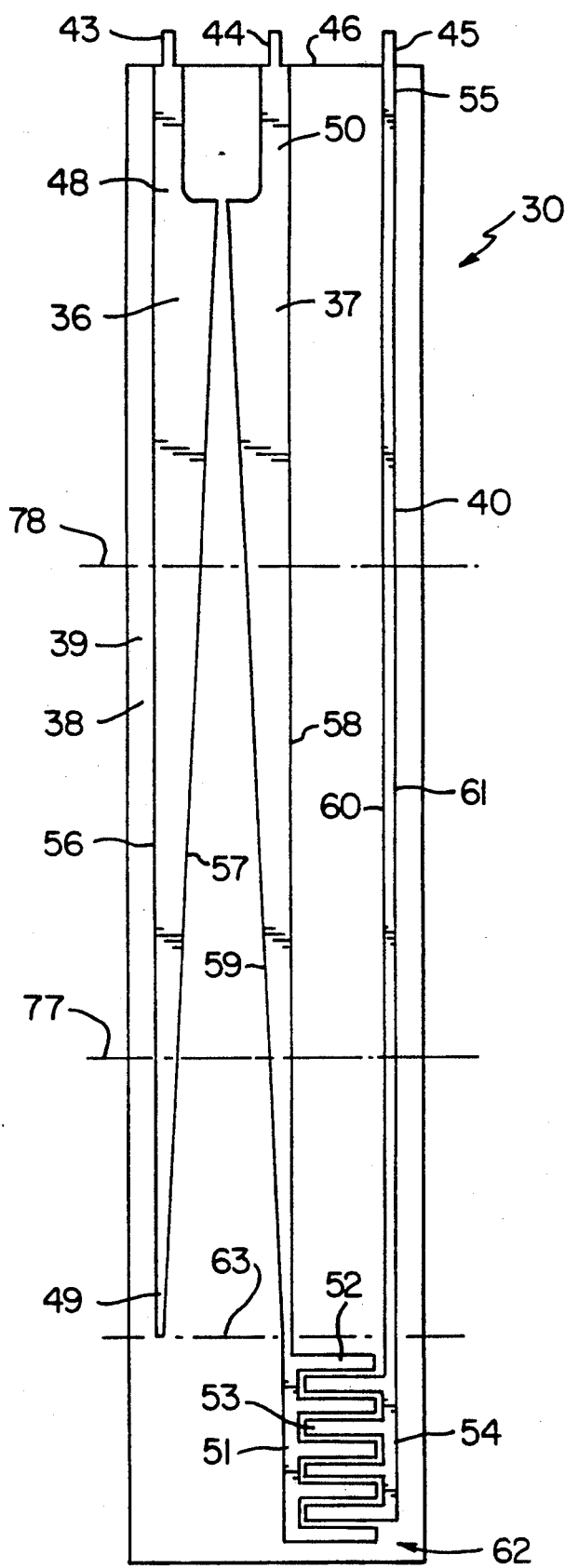
FIG. 2
FIG. 3

LIQUID LEVEL SENSING DEVICE AND METHODS OF MAKING AND OPERATING THE SAME

This is a division of application Ser. No. 581,014, filed Sep. 12, 1990 now U.S. Pat. No. 5,050,431.

BACKGROUND OF THE INVENTION

1. Field of the Invention

This invention relates to a new liquid level sensing device for determining the level of a liquid in a liquid confining means, such as a laundry machine, etc., and to methods of making and operating such a device.

2. Prior Art Statement

It is known to provide a liquid level sensing device for determining the level of a liquid in a liquid confining means, the device comprising a pair of electrode plate means disposed in spaced apart relation so as to be adapted to be in a certain position relative to the confining means and having opposed ends, electrical means connected to the electrode plate means for creating a voltage signal means therefrom that varies in relation to the level of the liquid in the confining means relative to the electrode plate means, and means for determining the actual level of the liquid from the signal means. Such prior known apparatus utilizes such signal means for determining the rotational position of a device that contains the liquid and is, therefore, an inclineometer.

SUMMARY OF THE INVENTION

It is one feature of this invention to provide a new liquid level sensing device that utilizes a capacitance arrangement for determining the level of a liquid in a liquid confining means regardless of the condition and/or type of liquid being utilized.

In particular, it was found according to the teachings of this invention that a pair of electrode plate means can be disposed in spaced apart relation in a certain position relative to a liquid confining means and have electrical means connected thereto for creating a voltage signal means therefrom that varies in relation to the level of liquid in the confining means relative to the electrode plate means and that a third electrode plate means can be disposed in spaced apart relation to the pair of electrode plate means and cooperate with one of the pair of electrode plate means to provide a reference voltage signal to determine the electrolytic base of the liquid so that the influence being provided by the particular liquid and/or the particular condition of the liquid being sensed at that time will not affect the accuracy of the liquid level sensing device.

For example, one embodiment of this invention provides a liquid level sensing device for determining the level of a liquid in a liquid confining means, the device comprising a pair of electrode plate means disposed in spaced apart relation so as to be adapted to be in a certain position relative to the confining means and having opposed ends, electrical means connected to the electrode plate means for creating a voltage signal means therefrom that varies in relation to the level of the liquid in the confining means, means for determining the actual level of the liquid from the signal means, and a third electrode plate means disposed in spaced apart relation to the pair of electrode plate means and being adapted to cooperate with one of the pair of electrode plate means to provide a reference voltage signal to determine the electrolytic base of the liquid.

Accordingly, it is an object of his invention to provide a new liquid level sensing device for determining the level of a liquid in a liquid confining means, the device of this invention having one or more of the novel features of this invention as set forth above or hereinafter shown or described.

Another object of this invention is to provide a new method of making such a liquid level sensing device, the method of this invention having one or more of the novel features of this invention as set forth above or hereinafter shown or described.

Another object of this invention is to provide a new method for operating such a liquid level sensing device, the method of this invention having one or more of the novel features of this invention as set forth above or hereinafter shown or described.

Another object of this invention is to provide a new laundry machine utilizing such a liquid level sensing device, the laundry machine of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIG. 2 is an enlarged side view of the liquid level sensing device utilized in the laundry machine of FIG. 1.

FIG. 3 is a cross-sectional view taken on line 3—3 of FIG. 2.

DESCRIPTION OF THE PREFERRED EMBODIMENTS

Figure 1:
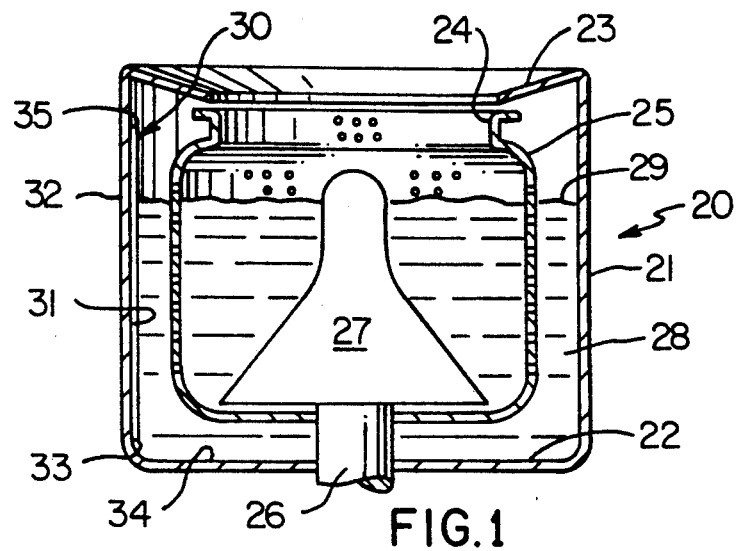
FIG. 1 is a schematic view that is partially in cross section and illustrates the new laundry machine of this invention utilizing the new liquid level sensing device of this invention.

While the various features of this invention are hereinafter illustrated and described as being particularly adapted to provide a liquid level sensing device for a laundry machine, it is to be understood that the various features of this invention can be utilized singly or in various combinations thereof to provide a liquid level sensing device for other apparatus as desired.

Therefore, this invention is not to be limited to only the embodiments illustrated in the drawings, because the drawings are merely utilized to illustrate one of the wide variety of uses of this invention.

Referring now to FIG. 1, the new laundry machine of this invention is generally indicated by the reference numeral 20 and comprises a conventional liquid confining means or tub 21 formed of any suitable material, such as plastic material, and having a closed bottom end 22 and an open top end 23 through which clothes and the like are adapted to be disposed into an open end 24 of a rotatable basket or perforated confining means 25 that is rotated relative to the outer stationary confining means 21 by a shaft means 26 all in a manner conventional in the art, the shaft means 26 also operating an agitator 27 that is disposed in the rotatable basket 25 also in a manner well known in the art.

Most laundry machines each have control means for setting a desired level that the liquid utilized therein is to reach on each cycle of operation thereof.

For example, in the embodiment illustrated in FIG. 1, such control means (not shown) has been set so that the water or liquid 28 in the confining means 21 will reach the level 29 for the wash cycle of operation of the laundry machine 20.

The prior known control means for controlling the level that the liquid in a laundry machine is to reach comprises a pressure operated electrical switch means. For example, see the Rhodes et al, U.S. Pat. No. 3,249,712, whereby this U.S. patent is being incorporated into this disclosure by this reference thereto.

Therefore, it can be seen that it is well known to have an adjustable liquid level setting device for a laundry machine or the like for terminating the flow of water into the laundry machine when the water level reaches the selected level whereby a further discussion of the reasons for selecting certain water levels in a laundry machine will not be further described and only the details of the structure and operation of the new liquid level sensing device of this invention in connection with the laundry machine 20 will now be set forth.

In particular, the new liquid level sensing device of this invention is generally indicated by the reference numeral 30 in FIGS. 1–5 and is disposed or secured in any suitable manner against an inside surface 31 of a sidewall means 32 of the tub 21 of the laundry machine 20 in the manner illustrated in FIG. 1 so that a lower or bottom end 33 of the device 30 is disposed slightly above a bottom surface 34 of the tub 21 while an upper end 35 of the device 30 is disposed adjacent the open end 23 of the tub 21 as illustrated whereby the device 30 is disposed in a flat manner against a straight vertical portion 31 of the sidewall means 32 of the tub 21 as illustrated. And it will be seen that the device 30 of this invention is relatively thin so that the same does not require a large amount of space to accommodate the same so that it is believed that modification of existing laundry machine structure is not required to use the device 30 of this invention.

As illustrated in FIGS. 2 and 3, the liquid level sensing device 30 of this invention comprises a pair of electrode plate means 36 and 37 disposed in spaced apart relation against one side 38 of a substantially rectangular electrically insulative sheet 39 and a third electrode plate means 40 also disposed against the side 38 of the sheet means 39 in spaced apart relation to the pair of electrode plate means 36 and 37.

Figure 4:
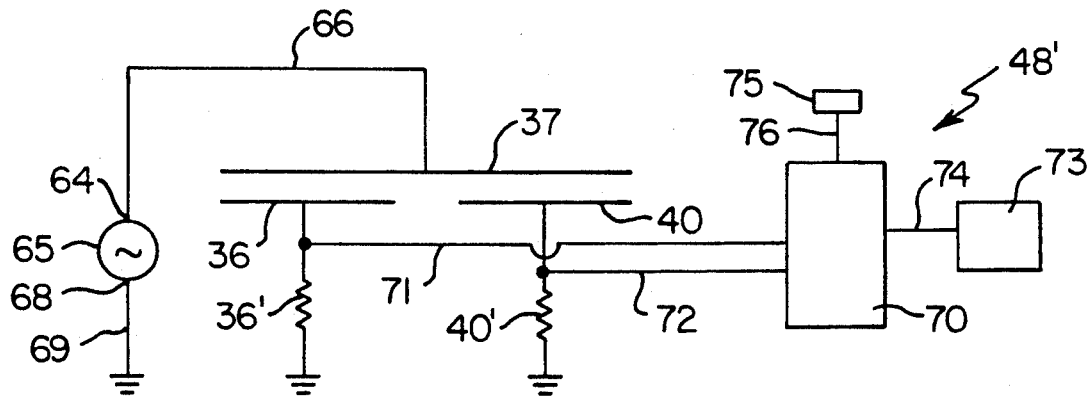
FIG. 4 is a schematic view illustrating the electrical circuit means or system of this invention utilizing the liquid level sensing device of this invention for operating the same.

Another electrically insulative sheet 41 has its side 42 disposed and secured against the side 38 of the sheet 39 so as to encapsulate the electrode plate means 36, 37 and 40 therebetween except that terminal parts 43, 44 and 45 of the respective plate means 36, 37 and 40 extend outwardly beyond the upper adjacent ends 46 and 47 of the sheets 39 and 41 as illustrated in FIG. 3 in order to electrically interconnect thereto the electrical circuit means of this invention, that is generally indicated by the reference numeral 48' in FIG. 4, in a manner hereinafter set forth.

While the electrode plate means 36, 37 and 40 can be formed of any suitable conductive material, in one working embodiment of the liquid level sensing device 30 of this invention, the same comprise adhesive-backed aluminum foil cut into the configurations illustrated in FIG. 3 and being secured to the side 38 of the sheet 39 by the adhesive backing thereof while the sheets 39 and 41 comprise thin sheets of mylar that are subsequently heat sealed together with the plate means 36, 37 and 40 disposed therebetween, the sheets 39 and 41 each being approximately 20 inches long and approximately 3 inches wide.

While the outwardly extending parts 43, 44 and 45 of the plate means 36, 37 and 40 are shown as being integral and one-piece therewith, in the one working embodiment of the device 30, the parts 43, 44 and 45 are separate terminal parts that have been soldered to the plate means 36, 37 and 40.

The electrode plate means 36 has an upper end 48 and a lower end 49 while the electrode plate means 37 has an upper end 50 similar to the end 48 of the plate means 36 and a lower end 51 that extends beyond the end 49 of the plate means 36 and comprising a plurality of substantially rectangular legs 52 extending to the right in FIG. 3 in spaced apart parallel relation to receive in an interleaved and spaced apart manner a plurality of parallel legs 53 formed at an end 54 of the electrode plate means 40 that has an upper end 55 disposed adjacent the ends 48 and 50 of the plate means 36 and 37 as illustrated.

The electrode plate means 36 has opposed side edges 56 and 57 with the side edge 56 being substantially straight and parallel to a like side edge 58 of the electrode plate means 37 while the edge 57 of the electrode plate means 36 is angled relative to a like edge means 59 of the electrode plate means 37, the edge means 57 and 58 being straight and converging toward each other as they approach the upper ends 48 and 50 of the plate means 36 and 37 as illustrated.

The electrode plate means 40 has a pair of opposed side edges 60 and 61 that are substantially straight and parallel to each other as well as parallel to the parallel edges 56 and 58 of the electrode plate means 36 and 37 as illustrated, the side edges 60 and 61 of the plate means 40 being disposed closely adjacent each other so as to define a relatively thin plate means 40 between the ends 55 and 54 thereof as illustrated.

The end 49 of the electrode plate means 36 terminates short of the interleaved area 62 of the ends 51 and 54 of the electrode plate means 37 and 40 as represented by the dash-dotted line 63 in FIG. 3.

In this manner, the interleaved area 62 of the electrode plate means 37 and 40 provides for a reference area for determining the electrolytic base of the liquid 28 in the confining means 21 as will be apparent hereinafter.

The liquid level sensing device 30 previously described is interconnected into the electrical circuit 48' illustrated in FIG. 4 by having one side 64 of a high frequency alternating current source 65 interconnected by a lead 66 to the electrode plate means 37 while the other side 68 of the source 64 is interconnected by a lead 69 to ground.

In the one working embodiment of the sensor 30 of this invention, the source 65 comprises a six volt AC source that has a frequency of approximately 15 KHz.

A microprocessor or other control means 70 is interconnected to the electrode plate means 36 by a lead means 71 and is interconnected to the electrode plate means 40 by a lead means 72 as illustrated in FIG. 4, the electrode plate means 36 and 40 also being respectively interconnected to ground by resistors 36' and 40'. The microprocessor 70 is also interconnected to a device 73 by an interconnection means 74, the device 73 being the means for controlling the flow of liquid 28 into the confining means 21.

The microprocessor 70 has a selector means 75 operatively interconnected thereto by interconnection means 76 so as to select the desired level that the system 48' is to provide for the liquid 28 in the confining means 21 for that particular cycle of operation of the laundry machine 20.

When the liquid level sensing device 30 of this invention is installed in the laundry machine 20 in the manner illustrated in FIG. 1 and is interconnected to the circuit means 48' in the manner illustrated in FIG. 4, the operator of the laundry machine 20 selects the desired level 29 that the liquid 28 is to provide in the laundry machine 20 by actuating the selector means 75 in any suitable manner, such as being set at a "Full-Heavy" wash load or at a "Light-Mini" wash load, etc. The operator then turns on the laundry machine 20 which has the device 73 begin to direct the water or liquid 28 into the confining means 21 to begin to fill the confining means 21 from the bottom 22 thereof toward the top 23 thereof in a conventional manner.

As the liquid 21 fills the confining means 21 from the bottom 22 to a level where the same reaches the line 63 on the sensing element 30, and with the alternating current source 65 applying a voltage to the electrode plate means 37 at a certain high frequency, a certain voltage is created on the electrode plate means 40 by capacitance through the coupling action of the water that provides the microprocessor 70 with a reference voltage signal whereby the microprocessor 70 determines the electrolytic base of the liquid 28 being provided in the confining means 21.

For example, if only pure water was being disposed into the confining means 21, the output voltage signal at the level 63 being provided on the reference electrode 40 would be one value and if the liquid 28 being provided in the confining means 21 was a soapy liquid provided by a certain detergent, that output voltage signal at the level 63 being provided on the reference electrode 40 would be different than when pure water was provided thereto. In this manner, the reference voltage signal being provided at the level 63 on the sensor 30 of this invention for the same voltage being applied to the electrode plate means 37 by the source 65 will vary depending upon the particular condition of the liquid being disposed into the confining means 21, such as whether the same is soft water, hard water, soiled water, soapy water, etc.

Thereafter, as the water level in the confining means 21 rises above the line 63 on the sensor 30, it can be seen that the liquid level will eventually start rising up the other electrode plate means 36 such as is represented by the dash-dotted line 77 in FIG. 3.

As the liquid level rises, the microprocessor 70 receives the voltage signal being created on the electrode plate means 36 by the capacitance action that is coupled by the water 28 as well as the voltage signal being created on the reference plate means 40 and determines from such voltage signals the actual level of the liquid in the confining means 21 at that time because the voltage signal being created on the electrode plate means 36 increases in a certain manner as the level of the liquid rises thereon even though the liquid is not in actual electrical contact with the electrode plate means 36.

Thus, should the selector 75 have been set in a position that the liquid level in the confining means 21 should only reach the line 78 illustrated in FIG. 3, which may be that the depth on the sensor means 30 will be approximately 15 inches above the bottom 33 of the device 30, the microprocessor 70 will turn off the device 73 which directs the liquid into the confining means 21 when the voltage being created by capacitance on the electrode plate means 36 reaches a value when divided by the voltage signal on the reference electrode plate means 40 equals the ratio value that the microprocessor 70 had calculated should be the ratio value at the 15 inch level. For example, the microprocessor 70 through appropriate software will have been set to divide the voltage being created on the electrode plate means 36 by the reference voltage being created on the reference electrode plate means 40 so that the only variable is the area of the electrode 36 in proximity to the liquid 28 in the confining means 21. In this manner, the microprocessor 70 will know what ratio value the voltage on the electrode plate means 36 will create at the liquid level 78 regardless of the type and/or condition of the liquid as the electrolytic base thereof has been taken out.

Therefore, it can be seen that the microprocessor 70 can control the device 73 to provide any selected water level 29 in the confining means 21 regardless of the type of liquid 28 being disposed therein because the reference area 62 establishes what the electrolytic base will be for the liquid and then determines what the actual liquid level is by dividing out that electrolytic base. In this manner, the ratio value created by the voltage on the electrode plate means 36 at the liquid level 78 will be the same regardless of the type and/or condition of the liquid for the same source 65.

Figure 5:
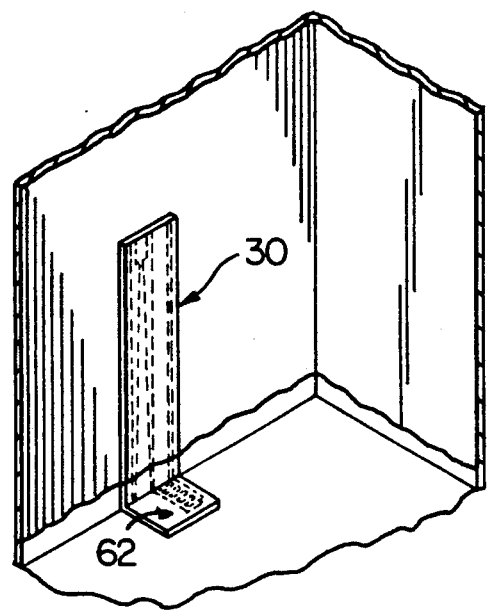
FIG. 5 is a broken away schematic perspective view illustrating the liquid level sensing device of this invention utilized with a different confining means than the confining means of FIG. 1.

While the sensor 30 previously described requires the liquid level to rise to the line 63 in FIG. 3 in order to provide for the reference voltage level, it is to be understood that the sensor 30 could be bent at the line 63 in the manner illustrated in FIG. 5 so that the reference area 62 only needs to be covered by a thin layer of liquid in order to provide the reference voltage as illustrated in FIG. 5. However, since in a laundry machine 20 a certain minimum level of liquid always has to be present therein in order to provide for a proper cycle of operation, then regardless of the level selected by the selector means 75 of FIG. 4, the liquid level will always be above the line 63 whereby the sensor 30 does not need to be bent in the manner illustrated in FIG. 5. However, the FIG. 5 arrangement permits an accurate control of the liquid level from a very low minimum amount thereof which is sufficient to cover the bent reference area 62 to any amount up the selector means 30 as illustrated.

In the one working embodiment of the liquid level sensing device 30 of this invention, the device 30 was inserted in a plastic column and fresh water was poured in the column to produce stepped levels of water at 3 inches, 4.5 inches, 6.0 inches, 7.5 inches, 9 inches, 10.5 inches, 12.0 inches, 13.5 inches, 15 inches, 16.5 inches and 18.0 inches. At each step level, a reading of the voltage created on the reference electrode plate means 40 was made while the signal out electrode plate means 36 was grounded and then a reading of the voltage created on the signal out electrode plate means 36 was made while the reference electrode plate means 40 was grounded. The resistors 36' and 40' each had a resistance value of approximately 33 K ohms. It can be seen from the following table of this test that the reference voltage created on the reference electrode plate means 40 at each step is substantially constant and it is believed that this is the result of having a relatively large reference area 62 and a narrow strip of the plate means 40 thereabove so that the reference voltage is not substantially influenced by the depth of the liquid. In contrast, it can be seen that the signal out voltage that developed on the electrode plate means 36 increased generally linearly and it is believed that this linearity is due to the tapering configurations of the electrode plate means 36 and 37.

| Test Table | | | |
|---|---|---|---|
| Depth | Reference Voltage | Sense Voltage | Ratio |
| 0.0 | 0.450 | 0.360 | 0.80 |
| 3.0 | 2.244 | 0.417 | 0.19 |
| 4.5 | 2.246 | 0.678 | 0.30 |
| 6.0 | 2.179 | 1.020 | 0.47 |
| 7.5 | 2.146 | 1.384 | 0.64 |
| 8.0 | 2.133 | 1.746 | 0.82 |
| 10.5 | 2.186 | 2.097 | 0.96 |
| 12.0 | 2.145 | 2.434 | 1.13 |
| 13.5 | 2.166 | 2.755 | 1.27 |
| 15.0 | 2.197 | 3.048 | 1.39 |
| 16.5 | 2.229 | 3.318 | 1.49 |
| 18.0 | 2.274 | 3.559 | 1.57 |

Thus from the above table, the microprocessor 70 when set at the selected level of 15 inches would determine that when the voltage on the signal out electrode plate means 36 divided by the reference voltage on the electrode plate means 40 equaled the ratio 1.39 as in the Ratio column of the above table, the microprocessor 70 would cause the control device 73 to terminate the flow of water into the confining means 21. It is believed that, regardless of the type and/or condition of the liquid being disposed in the test column, the ratio of the readings for that particular source 65 and sensing device 70 at 15 inches of depth would be approximately 1.39.

Therefore, it can be seen that the sensing device 30 of this invention will provide for an accurate determination of the liquid level being sensed thereby regardless of the condition and/or type of liquid being utilized therewith.

In particular, when an alternating current source at a certain high frequency, such as 15 KHz is applied to the input electrode 37 of the device 30 of this invention, two signals are derived on the two other electrodes 36 and 40. The electrode 40 is a reference electrode which is located at the base of the device 30 and, therefore, the majority 62 of the electrode 40 is in the liquid at all times during liquid level sensing of the device 30. This provides for compensation for variations in the dielective constant of the liquid and/or variations in the input voltage. The electrode 36 provides a signal which varies with the liquid level 29. Thus, the sensor 30 appears as two capacitors in parallel as illustrated in FIG. 4 and in the embodiment illustrated in the drawings, the electrode plate means 36, 37 and 40 are flat electrodes that are disposed in the same plane on an electrically insulating substrate 39 with the substrate 41 cooperating therewith to encapsulate the electrodes 36, 37 and 40 therebetween.

It is to be understood that, while the sensor 30 of this invention has been described for controlling the liquid level in a laundry machine 20, such sensor 30 could control the liquid level in other apparatus and, in fact, could merely provide an indication of the liquid level being sensed without controlling the level, as desired.

Therefore, it can also be seen that this invention not only provides a new liquid level sensing device and method of making and operating the same, but also this invention provides a new laundry machine utilizing such a liquid level sensing device or the like.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a none, useful and unobvious invention within the purview of the Patent Statute.

What is claimed is:

1. In a liquid level sensing device for determining the level of a liquid in a liquid confining means, said device comprising a pair of electrode plate means disposed in spaced apart relation so as to be adapted to be in a certain position relative to said confining means and having opposed ends, electrical means connected to said electrode plate means for creating a voltage signal means therefrom that varies in relation to the level of said liquid in said confining means relative to said electrode plate means, and means for determining the actual level of said liquid from said signal means, the improvement wherein a third electrode plate means is disposed in spaced apart relation to said pair of electrode plate means and is adapted to cooperate with one of said pair of electrode plate means to provide a reference voltage signal to determine the electrolytic base of said liquid, said third electrode plate means having opposed ends one of which is disposed adjacent one of said ends of said one of said pair of electrode plate means, said adjacent ends of said plate means being adapted to be disposed adjacent the bottom of said liquid confining means with the other ends thereof disposed adjacent the top of said liquid confining means, said pair of electrode plate means each having a pair of opposed side edge means extending between said opposed ends thereof, said pair of electrode plate means having the adjacent side edge means thereof angled relative to each other an converging toward each other as said adjacent side edges extend from said bottom of said liquid confining means toward said top thereof.

2. A liquid level sensing device as set forth in claim 1 wherein said adjacent ends of said electrode plate means respectively have portions thereof interleaved with each other in space apart relation.

3. A liquid level sensing device as set forth in claim 2 wherein the other electrode plate means of said pair of electrode plate means has one of said ends thereof disposed short of said adjacent ends so as to be adapted to be disposed above said adjacent ends when said adjacent ends are disposed adjacent said bottom of said liquid confining means.

4. A liquid level sensing device as set forth in claim 1 wherein said pair of electrode plate means are substantially flat and are disposed generally in side-by-side coplanar relation and said third electrode plate means is substantially flat and is disposed generally in a side-byside coplanar relation with said one of said pair of electrode plate means.

5. A liquid level sensing device as set forth in claim 1 wherein said pair of electrode plate means has the non-adjacent edge means thereof substantially parallel to each other.

6. A liquid level sensing device as set forth in claim 5 wherein said third electrode plate means has a pair of opposed side edge means that are disposed substantially parallel to each other and to said non-adjacent edge means of said pair of electrode plate means.

7. A liquid level sensing device as set forth in claim 1 and comprising a pair of sheet means encapsulating said pair of electrode plate means and said third electrode plate means therebetween.

8. A liquid level sensing device as set forth in claim 7 wherein each said electrode plate means comprises metallic foil.

9. In a laundry machine having a liquid confining means had a liquid level sensing device for determining the level of a liquid in said liquid confining means, the improvement wherein said device comprises a pair of electrode plate means disposed in spaced apart relation in a certain position relative to said confining means and having opposed ends, electrical means connected to said electrode plate means for creating a voltage signal means therefrom that varies in relation to the level of said liquid in said confining means relative to said electrode plate means, and means for determining the actual level of said liquid from said signal means, said liquid level sensing device comprising a third electrode plate means disposed in spaced apart relation to said pair of electrode plate means and being adapted to cooperate with one of said pair of electrode plate means to provide a reference voltage signal to determine the electrolytic base of said liquid, said third electrode plate means having opposed ends one of which is disposed adjacent one of said ends of said one of said pair of electrode plate means, said adjacent ends of said plate means being disposed adjacent the bottom of said liquid confining means with the other ends thereof disposed adjacent the top of said liquid confining means, said pair of electrode plate means each having a pair of opposed side edge means extending between said opposed ends thereof, said pair of electrode plate means having the adjacent side edge means thereof angled relative to each other and converging toward each other as said adjacent side edges extend from said bottom of said liquid confining means toward said top thereof.

10. A laundry machine as set forth in claim 9 wherein said adjacent ends of said electrode plate means respectively have portions thereof interleaved with each other in spaced apart relation.

11. A laundry machine as set forth in claim 10 wherein the other electrode plate means of said pair of electrode plate means has one of said ends thereof disposed short of said adjacent ends and is therefore disposed above said adjacent ends.

12. A laundry machine as set forth in claim 9 wherein said pair of electrode plate means are substantially flat and are disposed generally in side-by-side coplanar relation and said third electrode plate means is substantially flat and is disposed generally in a side-by-side coplanar relation with said one of said pair of electrode plate means.

13. A laundry machine as set forth in claim 9 wherein said pair of electrode plate means has the non-adjacent edge means thereof substantially parallel to each other.

14. A laundry machine as set forth in claim 13 wherein said third electrode plate means has a pair of opposed side edge means that are disposed substantially parallel to each other and to said non-adjacent edge means of said pair of electrode plate means.

15. A laundry machine as set forth in claim 9 and comprising a pair of sheet means encapsulating said pair of electrode plate means and said third electrode plate means therebetween.

16. A laundry machine as set forth in claim 15 wherein each said electrode plate means comprises metallic foil.

17. A laundry machine as set forth in claim 16 wherein each said electrode plate means comprises metallic foil.

18. In a method of making a liquid level sensing device for determining the level of a liquid in a liquid confining means, said device comprising a pair of electrode plate means disposed in spaced apart relation so as to be adapted to be in a certain position relative to said confining means and having opposed ends, electrical means connected to said electrode plate means for creating a voltage signal means therefrom that varies in relation to the level of said liquid in said confining means relative to said electrode plate means, and means for determining the actual level of said liquid from said signal means, the improvement comprising the steps of disposing a third electrode plate means in spaced apart relation to said pair of electrode plate means so as to be adapted to cooperate with one of said pair of electrode plate means to provide a reference voltage signal to determine the electrolytic base of said liquid, forming said third electrode plate means to have opposed ends one of which is disposed adjacent one of said ends of said one of said pair of electrode plate means, forming said adjacent ends of said plate means to be adapted to be disposed adjacent the bottom of said liquid confining means with the other ends thereof disposed adjacent the top of said liquid confining means, forming said pair of electrode plate means to each have a pair of opposed side edge means extending between said opposed ends thereof, and forming said pair of electrode plate means to have the adjacent side edge means thereof angled relative to each other and converging toward each other as said adjacent side edges extend from said bottom of said liquid confining means toward said top thereof.

* * * * *